INVENTOR
PAUL A. LINCOLN
BY
HIS ATTORNEY

INVENTOR
PAUL A. LINCOLN

June 29, 1965 P. A. LINCOLN 3,191,693
ROCK DRILL

Filed May 25, 1962 3 Sheets-Sheet 3

INVENTOR
PAUL A. LINCOLN
BY
HIS ATTORNEY

United States Patent Office 3,191,693
Patented June 29, 1965

3,191,693
ROCK DRILL
Paul A. Lincoln, Bloomsbury, N.J., assignor to Ingersoll-Rand Company, New York, N.Y., a corporation of New Jersey
Filed May 25, 1962, Ser. No. 197,655
3 Claims. (Cl. 173—78)

The present invention relates to rock drills and more particularly to a unique simplified rock drill.

Heretofore, to impart rotation and blows to a drill steel, the piston on its rearward stroke would be rotated by being moved relative to spiral flutes which were formed on a stationary rifle bar, the rotation of the piston being transmitted to a chuck and from the jaws on the chuck to the drill steel.

To provide for rotation of the drill steel independent of the piston, drifters have been constructed with a fluid motor, the rotation of which was transmitted through gears to an external shaft extending from the rear portion of the drilling apparatus to the front portion. At the front portion of the drilling apparatus, the shaft was provided with a gear which meshed with a gear formed on the chuck so that upon rotation of the shaft and chuck, the drill steel would be rotated. With this method a great deal of power was wasted to overcome the high friction load, further, the piston which was confined to a short stroke could not be properly rotated. All this resulted in the waste of a tremendous amount of energy which, of course, could have been more usefully applied to the drill steel.

It is the general object of the present invention to avoid and overcome the foregoing and other difficulties of and objections to the prior art practices by the provision of a rock drill having large bore and capable of much greateer power output which at the same time would be compact, light and easy to handle and control.

Another object of the present invention is to eliminate the waste of power by eliminating the high friction load.

Still another object of the present invention is to provide for the rotational drive of the shaft independently of the piston.

Yet another object of the present invention is for a more simplified design by providing for axial rotation from the center of the drill.

A further object of the present invention is to provide for a more compact structure having fewer parts which are subject to wear and replacement.

The aforesaid objects of the present invention, and other objects which will become apparent as the description proceeds, are achieved by providing a rock drill capable of exerting rotational as well as impact cutting power. Such improved rock drill has a tool end and a back end and in addition has a housing. A first rotation transmitting means is disposed within the housing. A tool holding means is rotatably engaged with the rotation transmitting means in such a manner as to receive rotational torque from the rotational transmitting means. Motor means are disposed on the housing in the back end adjacent to the rotation transmitting means. A second rotation transmitting means is disposed between said motor means and said first rotation transmitting means to transmit rotation from the motor to the first rotation transmitting means and thus achieve internal central axial rotation of the first rotation transmitting means. Impact means are disposed in the housing means and slideably associated with the first rotation transmitting means to deliver impact blows to the tool holding means. In addition lubricating means are disposed within the first rotation transmitting means and communicating with the tool holding means for providing lubrication to the tool holding means.

For a better understanding of the present invention reference should be had to the accompanying drawings, wherein like numerals of reference indicate similar parts throughout the several views and wherein:

FIGURE 1 is a longitudinal sectional view of the rock drill, showing the piston in its forwardmost position;

FIGURE 1-A is a continuation of the longitudinal sectional view of the rock drill continued from line 1–A—1–A of FIGURE 1 in the direction of the arrows;

Although the principles of the present invention are broadly applicable to apparatus having auxiliary rotation means but where axial rotation from the center is desirable, the present invention is particularly adapted for use in conjunction with rock drills and hence it has been so illustrated and will be so described.

Figures 1, 1A:
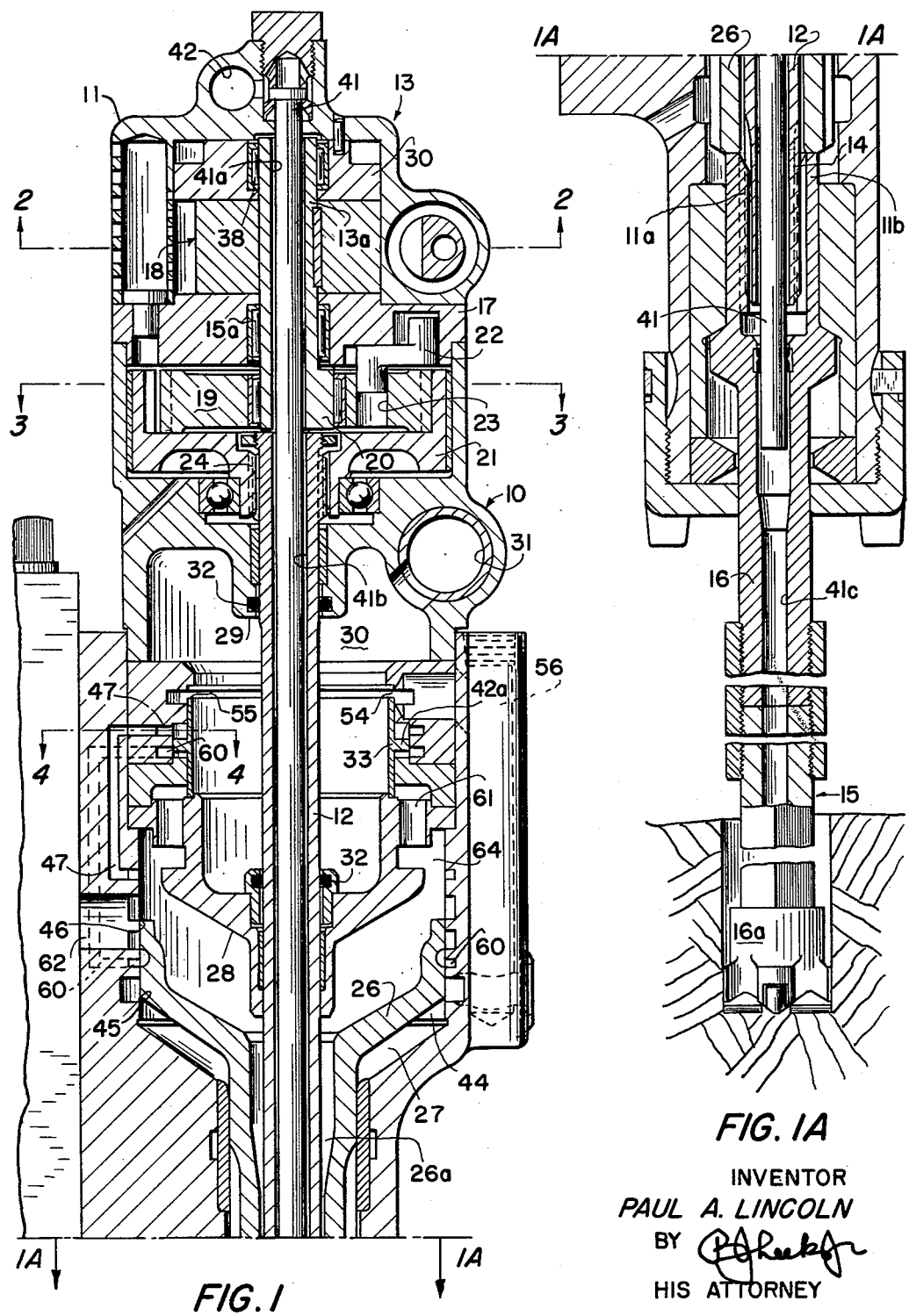
Figure 4:
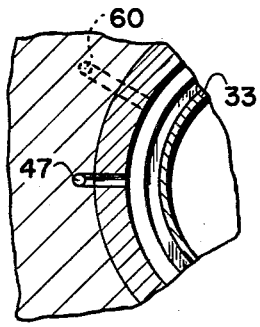
FIGURE 4 is a sectional view along the line 4—4 of FIGURE 1, in the direction of the arrows, and showing kicker ports.

Referring to FIGURE 1A housing means such as a drill housing of a rock drill 11 is indicated generally by the reference numeral 10. A first rotation transmitting means, such as a hollow torque shaft 12, is disposed axially in the drill housing 10 and extends from the back end 13 of the rock drill 11 to the tool or front end 15. The front portion of the torque shaft 12 is splined at 14 to engage a splined counterbored portion 11a in the rear end of a tool holding means, such as a drill steel 16 (disposed on the drill housing 10 in the tool end 15) for transmitting rotation to the drill steel 16. Rotation is supplied to the rock drill 11 by motor means, such as an air motor 18.

Air motor assembly

Figure 2:
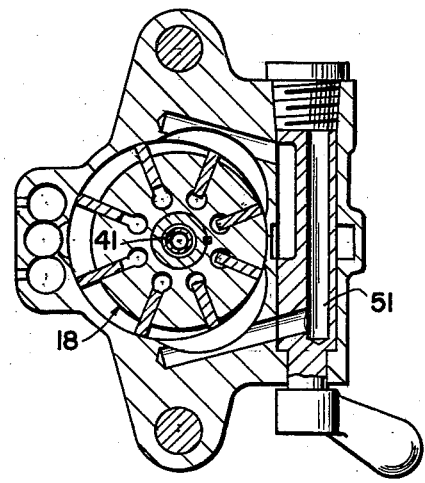
FIGURE 2 is a sectional view along the line 2—2 of FIGURE 1 in the direction of the arrows, and showing a vane motor.

The air motor 18, as best shown in FIGURE 2 is disposed in the rear portion 13 of the device. A rotor shaft 13a of the air motor 18 is mounted for rotation in bearings 38 and 15a (FIG. 1) which bearings 38 and 15a are disposed in supporting walls 30 and 17 of the back end 13 of the rock drill 11. Since the air motor 18 has a far greater rotation in r.p.m. than the rotation desired for the drill steel 16, a second rotation transmitting means, such as a gear assembly comprising an eccentric 20, internal oscillating gear 19, and external gear 21 is provided to accomplish the dual purpose of transmitting rotation from the air motor 18 to the torque shaft 12 to attain central rotation drive, and to also accomplish the reduction of speed required to properly drive the drill steel 16.

To achieve the central rotation drive of the torque shaft 12, the air motor 18 through the eccentric 20 on the rotor shaft 13a drives the internal oscillating gear 19 which in turn drives driven gear 21 which in turn transmits rotation to the torque shaft 12 through spline 24. Therefore, it can be seen that axial rotation of the drill steel 16 from the center of the drill is now achieved.

At the same time the required r.p.m. reduction is accomplished by providing the forward end of rotor shaft 13a (FIG. 1) with eccentric 20 which is disposed within an axial bore in the internal gear 19. Surrounding gear 19 is the external gear 21 which is spline connected at 24 to torque shaft 12 to accomplish the transfer of rotation to the shaft 12. A pin 22 having one end retained in casing wall 17 extends into a hole 23 in internal gear 19 (FIG. 1). Pin 22 functions to prevent rotation of internal gear 19 so that, as eccentric 20 rotates, internal gear 19 is oscillated into engagement with the teeth of external gear 21. Sufficient clearance is allowed pin 22 in wall 17 to permit the internal gear 19 to follow the eccentric 20.

For each revolution of eccentric 20, the external gear 21 is rotated two teeth. It can be seen that if the internal gear 19 and external gear 21 are provided with 34 and 36 teeth respectively, a speed reduction of 18 to 1 is achieved so that with a motor speed of 3,200 r.p.m., the drill steel 16 will be rotated at 178 r.p.m.

The speed of rotation of the motor 18 may be varied by means of a throttle valve 51 (FIG. 2) disposed in a fluid supply passage to the motor 18. Therefore, as above indicated rotation of external gear 21 causes rotation of torque shaft 12 by reason of the spline connection at 24. Rotation of torque shaft 12 is transmitted to the drill steel 16 through the spline connection at 14 thus accomplishing the desired central drive.

To provide for delivery of impact blows to the drill steel 16 simultaneously but independently from the rotation of the torque shaft 12, impact means, such as a hammer piston 26, is provided.

Hammer piston assembly

Figure 5:
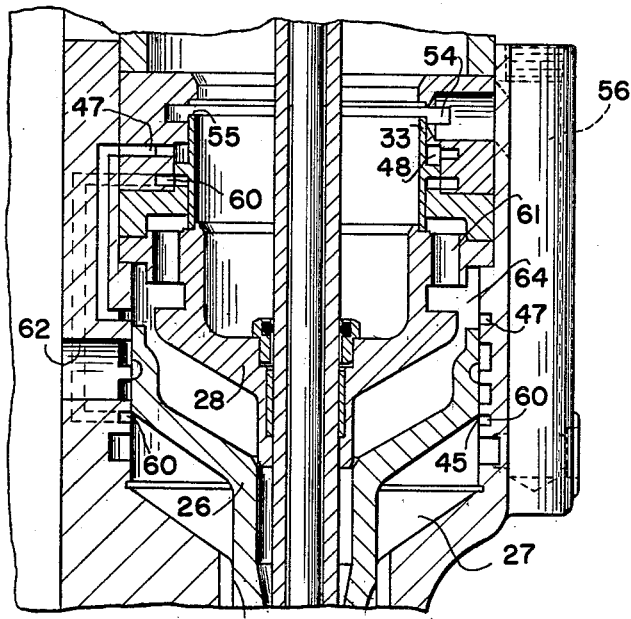
FIGURE 5 is a fragmentary longitudinal view of a portion of FIGURE 1 illustrating the position of the piston in the rearmost position.
Figure 6:
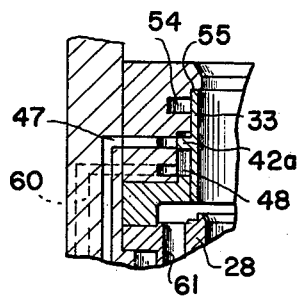
FIGURE 6 is a fragmentary sectional view partially in longitudinal section of the left side of FIGURE 1 showing a spool type valve in its rearmost position.

Hammer piston 26 (FIG. 1) is provided with an axial bore 26a, through which torque shaft 12 extends. The hammer piston 26 is reciprocably mounted in a cylinder 27 the end of which is closed by a conical shaped wall 28. Wall 28 and a rearwardly spaced wall 29 define a plenum chamber 30 which receives fluid, such as air, under pressure from a supply port 31. To prevent fluid leakage from plenum chamber 30, the space between walls 28 and 29 are made fluid tight by seals 32. A spool type valve 33 is disposed in plenum chamber 30 to control flow of pressure fluid to cylinder 27 through suitable porting (FIG. 1) to thereby effect reciprocation of hammer piston 26. The reciprocating movement of the hammer piston 26 is accomplished by air being admitted through passage 54 passing then through port 56 to the front supply cavity 44 of the hammer piston 26 (FIG. 1), thus causing the hammer piston 26 to move rearwardly, from the position shown in FIGURE 1 to the position shown in FIGURE 5, until its front edge 45 uncovers the front kicker port 60 (FIG. 5). Uncovering of port 60 permits pressurized air to pass through port 60 thus pushing up against valve 33 and causing the valve edge 55 of valve 33 to move from the position shown in FIGURE 1 to the position shown in FIGURE 6, toward the back end of the rock drill 11. As the valve 33 moves toward the back end of the rock drill 11, it closes the passage 54 to shut off the air supply to the front supply cavity 44 of the hammer piston 26. At the same instant as the spool type valve 33 is moving to close passage 54 it exposes a rear supply port 61 (FIG. 6) which emits air through a rear supply cavity 64 to slow down and stop the hammer piston 26. At the same time, as the hammer piston 26 is moving back, an exhaust port 62 is uncovered thereby exhausting the front supply cavity 44 to the atmosphere. Now the pressure which builds up in the back supply cavity 61 begins to push the hammer piston 26 forward, to the position shown in FIGURE 1, toward the drill steel 16. As the back edge of the hammer piston 26 moves forward it uncovers a back kicker port 47 (FIG. 1). This uncovering of the port 47 permits pressurized air to act against a kicking flange 42a of a valve 33 (FIG. 1) thereby causing valve edge 55 to move forward toward the drill steel 16 and permit air to enter the front supply cavity 44. The back edge 46 of the hammer piston 26 moves forward thus opening the rear supply cavity 64 to exhaust.

Thereafter the cycle of the hammer piston 26 starts over again. As the hammer piston 26 reciprocates, it imparts to the shank piece 11b impact energy which is, of course, transmitted to the drill steel 16. Thus it can be seen how impact energy is supplied to the drill steel 16 independently of the rotational drive, thus eliminating loss of power through high friction loads. To provide for the introduction of a cleansing fluid such as air, into the bore of the drill steel 16, a tube 41 (FIG. 1) is disposed to extend coaxially through a bore 41a in rotor shaft 13a and a bore 41b in shaft 12 and into the bore 41c of drill steel 16. The rear end portion of tube 41 is connected to a supply of cleansing fluid (not shown), either liquid or air, through supply port 42.

Operation

Figure 3:
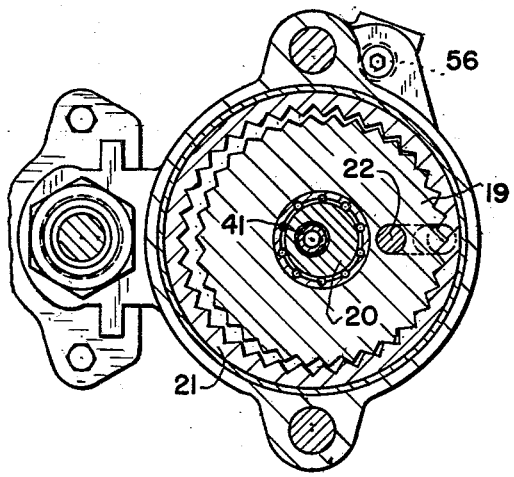
FIGURE 3 is a sectional view along the line 3—3 of FIGURE 1 in the direction of the arrows, and showing a gear assembly.

Even though it is believed the operation of the apparatus will be apparent from the foregoing description, a brief review of such operation will now be made for purposes of summary and simplification. The auxiliary air motor 18 (FIG. 2) located in the drill housing 10 at the back end 13 of the rock drill 11 adjacent to torque shaft 12 (FIG. 1), provides rotation to the torque shaft 12 through a gear assembly comprising an eccentric 20, internal gear 19, and external gear 21 (FIG. 3). The gear assembly not only transmits the rotation from the air motor 18, but also serves to greatly reduce the r.p.m. from that produced by the air motor 18 to that delivered to the torque shaft 12. The torque shaft 12 in turn is rotatively attached to the drill steel 16 (FIG. 1-A) and thus serves to provide turning power for the drill steel 16, which will eventually hold the drill tool 16a. Operating independently but coaxially with the torque shaft 12 is a reciprocating hammer piston 26 which serves to deliver impact energy to the drill steel 16 simultaneously with but independently of the rotation of such drill steel 16.

It will be recognized by those skilled in the art that the objects of the present invention have been achieved by providing a compact rock drill having fewer parts, but at the same time providing central rotation to the drill steel. Such improved rock drill also provides impact energy to the drill steel through a hammer piston which operates independently but coaxially with the torque shaft, thus eliminating the high friction load and the need for installing a bulky heavy head in the drill which absorbs drill energy thus resulting in inefficient waste.

While in accordance with the patent statutes a preferred embodiment of the present invention has been illustrated and described in detail, it is to be particularly understood that the invention is not limited thereto or thereby.

I claim:
1. A rock drill comprising:
  (a) a housing;
  (b) a drill steel associated with said housing adjacent the longitudinal forward end thereof;
  (c) a hammer piston slidably disposed within said housing adjacent the longitudinal rear end of said drill steel to deliver impact blows thereto;
  (d) said hammer piston having a longitudinal centrally disposed bore therethrough;
  (e) fluid actuated means for controlling the slidable movement of said hammer piston within said housing to cause said piston to deliver said impact blows to said drill steel;
  (f) a first fluid port within said housing and communicating said fluid actuated means with a source of pressurized fluid; and
  (g) means for supplying rotation to said drill steel independently of said slidable movement of said hammer piston;
  (h) said rotation supplying means comprising fluid actuated motor means carried by said housing adjacent the longitudinal rear end thereof;
  (i) a second fluid port within said housing and communicating said fluid actuated motor means with a source of pressurized fluid independently of said first fluid port;

(i) first shaft means rotatably carried within said housing adjacent said motor means to receive rotary movement from said motor means;

(k) second shaft means rotatably disposed within said housing and passing through said longitudinal bore in said hammer piston;

(l) said second shaft means being fixedly secured to said drill steel to impart rotation thereto; and (m) gear means connecting said first and second shaft means and supplying said second shaft means with rotary movement at a speed reduced from that of said first shaft means.

2. A rock drill comprising:

(a) a housing;

(b) a drill steel associated with said housing adjacent the longitudinal forward end thereof;

(c) a hammer piston slidably disposed within said housing adjacent the longitudinal rear end of said drill steel to deliver impact blows thereto;

(d) said hammer piston having a longitudinal, axially disposed bore therethrough;

(e) fluid actuated means for controlling the slidable movement of said hammer piston within said housing to cause said piston to deliver said impact blows to said drill steel; and (f) means for supplying rotation to said drill steel simultaneously with said slidable movement of said hammer piston and independently thereof;

(g) said rotation supplying means comprising fluid actuated motor means carried by said housing adjacent the longitudinal rear end thereof;

(h) said fluid actuated motor means and said fluid actuated means for controlling the slidable movement of said hammer piston being independently connected to a source of pressurized fluid;

(i) first shaft means rotatably carried by said housing operatively adjacent said motor means to receive rotary movement from said motor means;

(j) second shaft means rotatably carried by said housing and passing through said longitudinal bore in said hammer piston;

(k) said second shaft means being fixedly secured to said drill steel to impart rotation thereto; and (l) planetary gear means connecting said first and second shaft means to supply said second shaft means with rotary movement at a speed reduced from that of said first shaft means.

3. A rock drill according to claim 2 wherein said first and said second shaft means extend longitudinally on the longitudinal axis of said housing and include aligned longitudinal bores therethrough, said drill steel includes a longitudinally extending bore therein in axial alignment with said bores in said first and second shaft means, and a lubricant supplying member extends through said bores in said aligned first and second shaft means and into said bore in said drill steel.

References Cited by the Examiner

UNITED STATES PATENTS

| | | | |
|---|---|---|---|
| 1,212,141 | 1/17 | Kimber | 173—104 |
| 1,313,859 | 8/19 | Gilman | 173—105 |
| 1,965,264 | 7/34 | Smith | 173—134 |
| 2,778,605 | 1/57 | Hunn | 173—78 |
| 2,824,547 | 2/58 | Sherrill | 173—106 |

MILTON KAUFMAN, *Primary Examiner.*

BROUGHTON G. DURHAM, *Examiner.*